Oct. 16, 1928.　　　　　　　　　　　　　　　　　1,687,572
W. LA HODNY
REAR VIEW MIRROR FOR AUTOMOBILES
Filed Nov. 16, 1925　　　2 Sheets-Sheet 1
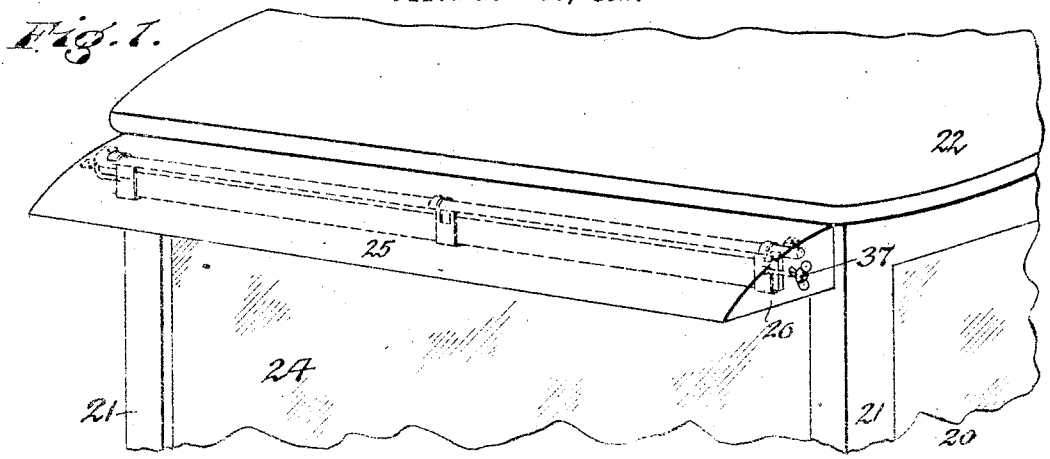
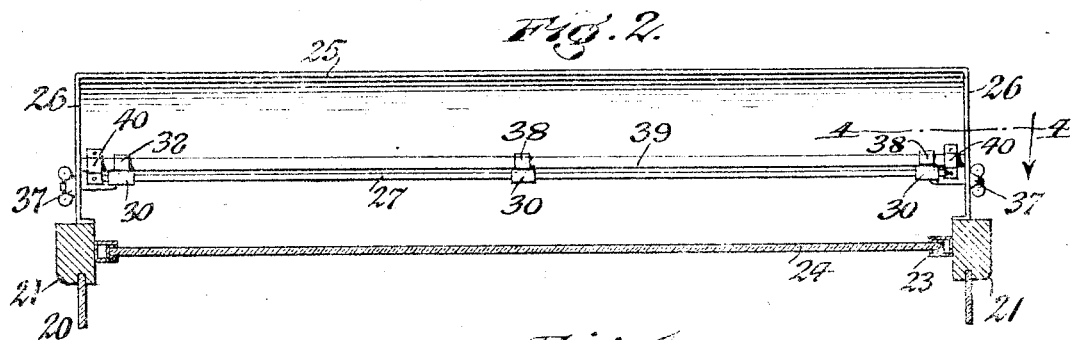
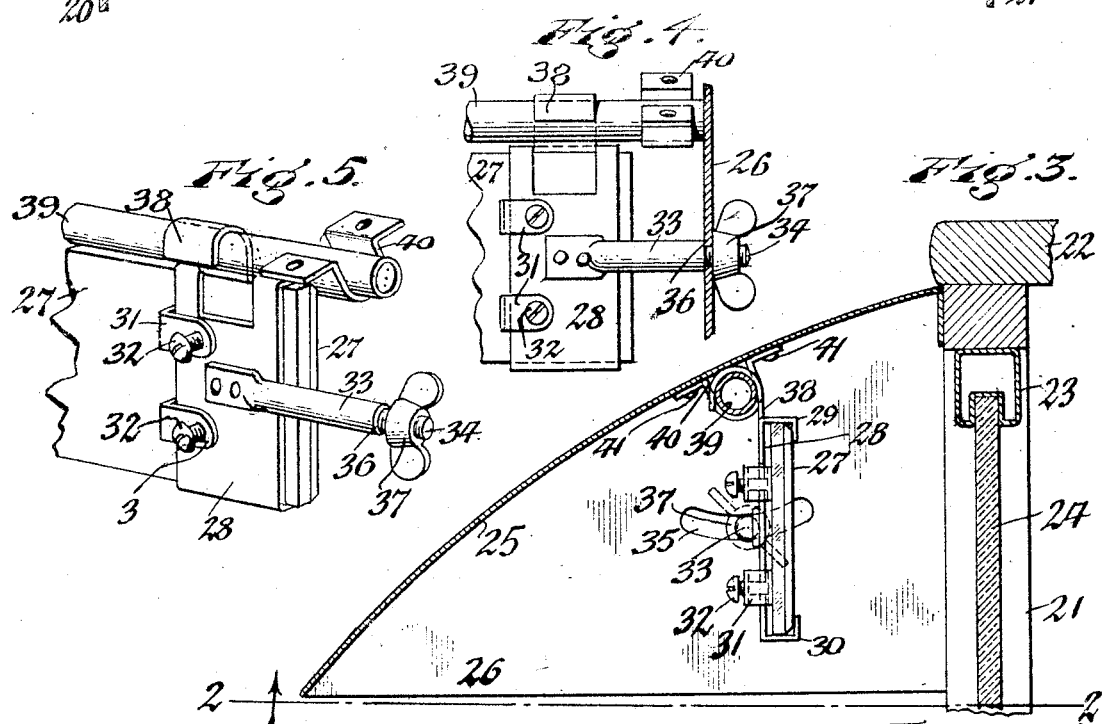

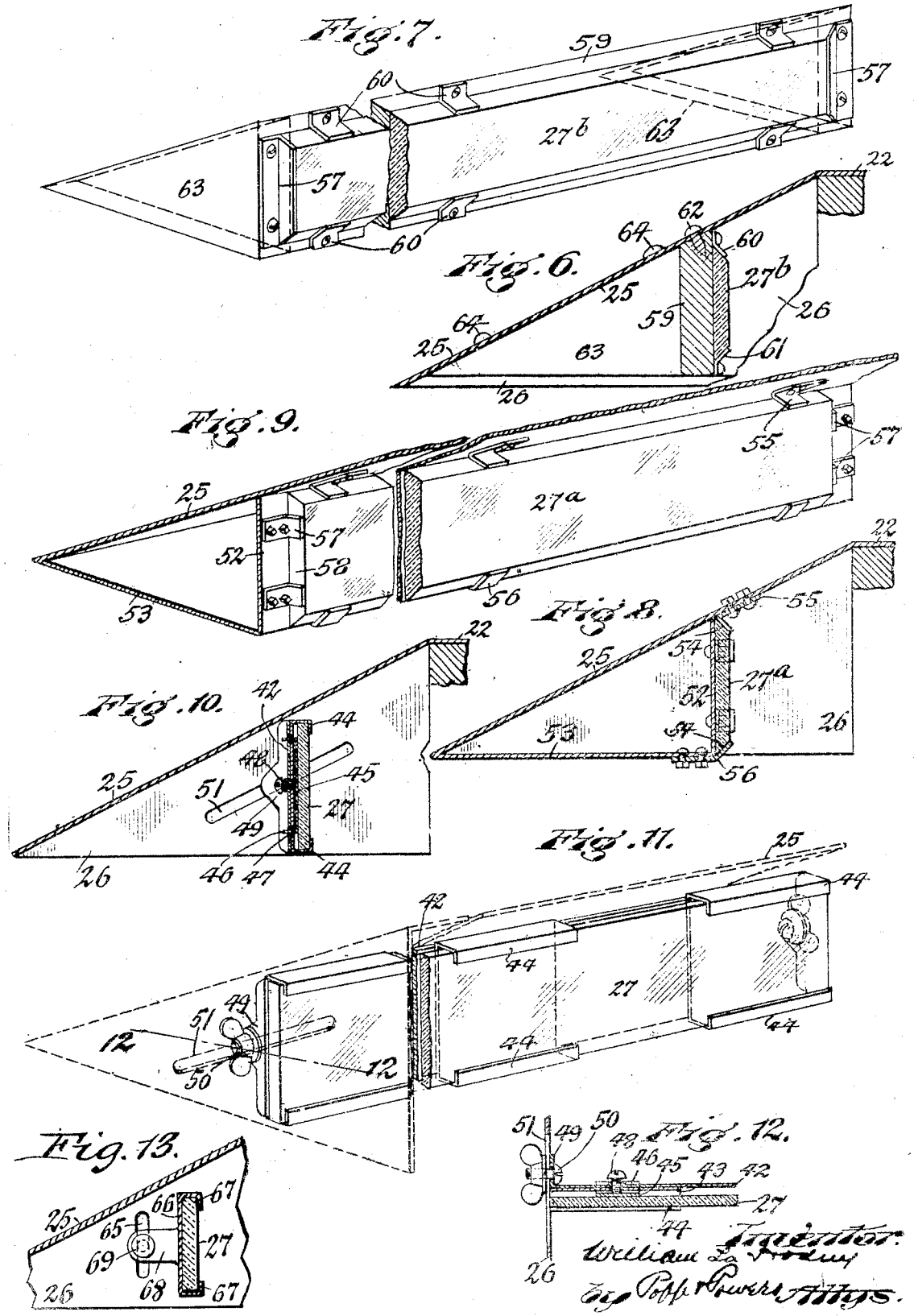

Patented Oct. 16, 1928.

1,687,572

UNITED STATES PATENT OFFICE.

WILLIAM LA HODNY, OF BUFFALO, NEW YORK, ASSIGNOR TO STANDARD MIRROR COMPANY, INC., OF BUFFALO, NEW YORK, A CORPORATION OF NEW YORK.

REAR-VIEW MIRROR FOR AUTOMOBILES.

Application filed November 16, 1925. Serial No. 69,233.

This invention relates to a rear view mirror which enables the driver and passengers of an automobile to observe the condition across the entire width of the road, and more particularly to a mirror of this character which is arranged in front of the windshield and below the visor.

The object of this invention is to so mount this rear view mirror on the exterior of the car so that all liability of persons striking this mirror upon entering or leaving the car and being injured thereby is avoided.

To that end this invention consists broadly in providing a rear view mirror which extends practically across the entire width of the car so as to enable the driver and any passengers in the same to obtain a full view of the roadway in rear of the car across its entire width and thus increase safety in traffic on highways. More specifically this invention consists in the use of such a full width mirror which is arranged in front of the windshield and below the visor which projects forwardly from the roof of the car and upon which this mirror is so mounted that the same will not be disturbed by or interfere with the free opening of the windshield and also to be protected against rain, snow and sleet and also capable of being tilted and adjusted to different heights to suit the requirements of the driver or other conditions.

In the accompanying drawings:

Figure 1, is a perspective view of the cab portion of an automobile equipped with one form of my invention in which the rear view mirror extends approximately across the entire width of the car.

Figure 2, is a horizontal section of the same taken on line 2—2, Fig. 3, looking upwardly and on a reduced scale.

Figure 3, is a vertical longitudinal section of the upper part of the windshield, the roof of the cab and the visor equipped with one form of my invention.

Figure 4, is a fragmentary vertical section of the same taken on line 4—4, Fig. 2 looking rearwardly.

Figure 5, is a fragmentary perspective view of the rear view mirror and the means for supporting the same on the top of the visor corresponding to the construction shown in Figs. 1-4.

Figure 6, is a fragmentary vertical longitudinal section showing another form of my invention in which the rear view mirror extends approximately across the entire width of the car and is mounted on the under side of the visor and in front of the windshield.

Figure 7, is a fragmentary perspective view of the same.

Figure 8, is a view similar to Fig. 6 but showing another modification of my invention in which the rear view mirror is mounted on a transverse sheet metal wall and a bottom plate forming part of the visor.

Figure 9, is a fragmentary perspective view of the construction shown in Fig. 8.

Figure 10, is a vertical longitudinal section similar to Figs. 6 and 8 showing still another form of my invention for mounting a full width rear view mirror on the visor below the top thereof.

Figure 11, is a fragmentary perspective view of the construction shown in Fig. 10.

Figure 12, a fragmentary horizontal section taken on line 12—12, Fig. 11.

Figure 13, is a fragmentary vertical longitudinal section showing another modification of this invention.

Similar numerals refer to similar parts throughout the several views.

Referring to Figs. 1–3 the numeral 20 represents generally a cab or passenger compartment of an automobile which comprises two upright stanchions 21, 21, arranged at the front ends of the side walls thereof, a canopy or roof 22 arranged over the passengers' compartment, a windshield arranged in front of the passengers' compartment and between the stanchions 21, 21, and comprising a frame 23 and a transparent pane of glass 24 mounted in this frame, and a visor projecting forwardly from the front end of the canopy or roof and beyond the windshield and consisting of a forwardly curved or inclined top 25 and two vertical longitudinal side walls 26 depending from opposite longitudinal edges of the visor top 25.

The rear view mirror 27 in the present case is comparatively narrow, but of sufficient length to extend horizontally across the entire width of the car, or approximately so, whereby the driver or other persons looking into the mirror can observe the condition of the traffic in rear of the car entirely across the roadway and while occupying any part of the car. In the preferred construction this rear view mirror is arranged in front of the windshield and below the top of the visor and so mounted that it will not interfere with the free opening and closing of the windshield but is protected against the weather and is capable of being raised or lowered and also tilted at various angles to suit different requirements or conditions.

In the construction shown in Figs. 1–5 the mirror is mounted on a plurality of brackets, three of such brackets being shown, as an example of a satisfactory number, and each of these brackets comprising an upright supporting plate or body 28 which is adapted to be arranged at the back of the mirror and provided at its upper and lower edges with forwardly projecting hooks 29, 30 which engage around the upper and lower edges of the rear view mirror 27, retaining clips 31 of U-form embracing an edge of the supporting plate or body 28 and engaging with one arm against the back side of the rear view mirror while its other arm is arranged in front of the respective supporting plate 28, and a clamping screw 32 passing through an opening in the front arm of the respective clip and engaging with a threaded opening in the supporting plate 28 and bearing at its rear end against the rear arm of the clip for the purpose of pressing the latter against the back of the mirror and holding the same reliably in engagement with the hooks 29, 30. The supporting plates or bodies 28 of the brackets adjacent to the ends of the rear view mirror are each provided with a horizontal adjusting rod 33 which projects laterally therefrom and is provided with a reduced screw threaded stem 34 which passes through a longitudinal slot 35 in the adjacent side wall of the visor and forms an outwardly facing shoulder 36 on this rod which bears against the inner side of the visor side wall, and a screw nut 37 arranged on the threaded shank 34 and bearing against the outer side of the respective visor side wall, as best shown in Fig. 4. Upon loosening the screws 37 the brackets together with the rear view mirror mounted thereon may be moved forwardly and backwardly relatively to the visor and also tilted with reference thereto for the purpose of adjusting the line of vision and enabling the driver or other passengers looking forwardly into the mirror to observe the traffic conditions in rear of the car across the entire roadway. After adjustment, the rear view mirror may be held in place by tightening the screw nuts 37.

If desired the brackets of the rear view mirror may be additionally supported by providing each of the supporting plates of the several brackets at its upper edge with a forwardly and downwardly projecting hook 38 which engages over a horizontal supporting rod 39 arranged transversely underneath the visor top, and a plurality of clips 40 which embrace said supporting rod 39 and are secured to the under side of the canopy top by means of rivets 41, as shown in Fig. 3, or by any other suitable means. When the brackets are thus mounted on a supporting rod the same can be swung about this rod as an axis, in which case the slots 35 in the side walls of the visor are curved concentrically with the axis of the supporting rod to permit of such adjustment.

If desired substantially the same results can be obtained by the construction shown in Figs. 10, 11 and 12 in which a support for the mirror is provided which extends the full length of the same and is adjustably mounted on the visor. In this construction the numeral 42 represents a main supporting plate which is arranged vertically in the back of the mirror and extends the full length of the same. At intervals this main supporting plate is provided with supporting heads each of which consists of a body plate 43 secured to the rear side of the main supporting plate 42 by means of solder or otherwise and provided at its upper and lower edges with rearwardly projecting hooks 44, 44 which engage around the upper and lower edges of the rear view mirror. The latter is pressed forwardly against these hooks by means of a clamping device consisting of a presser plate 45 bearing against the back side of the mirror and provided at its upper and lower edges with guide lugs 46 which pass through slots 47 formed in corresponding parts of the main supporting plate 42 and the head plate 43, and a clamping screw 48 arranged in a threaded opening in the plates 42 and 43 and bearing against the front side of the presser plate 45, as shown in Fig. 12. At its opposite ends the main supporting plate is provided with two rearwardly projecting lugs 49 which are clamped against the inner side of the visor side walls 26 by means of bolts 50 passing through longitudinal slots 51 in these side walls. These slots 51 are preferably inclined so that by loosening the clamping bolts 50 the supporting means of the rear view mirror may either be tilted vertically or the same may be raised and lowered bodily by sliding the same uniformly at opposite ends in the inclined slots 51, or the mirror may be tilted laterally into different angles by raising one end of the same more than the other, after which tightening of the bolts 50 will hold the mirror in its adjusted position.

Instead of mounting the full width rear view mirror on the visor so that it is capable of adjustment, this mirror may be fixedly mounted on the visor in a pre-determined position and at such an angle as will best suit all of the conditions or requirements for obtaining a good view of the roadway in rear of the car.

In the construction shown in Figs. 8 and 9, the visor is provided with an upright transverse wall 52 which is arranged about midway between the front and rear ends thereof and extends downwardly from the under side of the visor top 25 to the lower edge of its side walls 26, and a bottom plate 53 which connects the lower edges of the side wall 26 and extends from the lower edge of the transverse wall 52 to the front edge of the top 25. The rear view mirror 27ª in this case is preferably beveled at its upper and lower edges, as shown at 54 and the same is held with its back against the rear side of the supporting plate 52 by means of upper clips 55 secured to the under side of the visor top and engaging with the upper beveled edge of the mirror, lower clips 56 secured to the bottom 53 of the visor and engaging with the lower beveled edge of the mirror, and end clips 57 secured to the end portions of the upright supporting plate 52 and engaging with the ends 58 of the mirror which preferably are also beveled, as shown.

If desired the rear view mirror 27ᵇ may be secured to the rear side of a wooden cross bar 59 by means of upper and lower clips 60, 61, and this cross bar may be secured at its upper edge by means of screws 62 or otherwise to the visor top 25 while its opposite ends may be secured to V-shaped blocks 63 which extend forwardly from the supporting bar 59 and are secured to the under side of the visor top by means of screws 64, as shown in Figs. 6 and 7 or by other suitable means.

Instead of making the slot in the side wall 26 of the visor inclined, as shown in Figs. 10 and 11, the same may be arranged vertically, as shown at 65 in Fig. 13. In this case the head 66 of the bracket is provided with upper and lower hooks 67 which engage around the upper and lower edges of the rear view mirror 27 and the plate 66 is also provided with forwardly projecting arms 68 each of which is secured to a side wall of the visor by means of a clamping bolt 69 passing through the slot 65.

Upon loosening the bolt 69 the plate 66 together with the mirror mounted thereon may be tilted in a vertical plane and the same may also be raised vertically by shifting the bolt 69 in the slot 65, and this mirror may also be tilted sidewise into various angles by raising the mirror plate 66 more on one side of the visor than on the other, and then the mirror may be held in this position by tightening the clamping bolts 69 on opposite sides of the visor.

In the various constructions of this invention as above described the rear view mirror extends the full width of the car, or nearly so, which gives the widest possible vision of the width of the roadway in rear of the car, the same is arranged outside of the passengers' compartment so that all danger of collision with the rear view mirror and possible injury thereby is avoided, the mirror is arranged in front of the windshield at a sufficient distance therefrom which will avoid interference therewith upon opening and closing the same, it is protected by the visor from rain, snow and sleet, and when desired the same may also be adjusted to suit different conditions or requirements with ease and facility.

I claim:—

1. An automobile visor having a top and side walls provided with longitudinal slots, a rear view mirror arranged below said top, and means for supporting said mirror comprising a plate which carries said mirror and which has its ends arranged adjacent to the inner sides of said walls, and bolts connected with said plate and passing through said slots and bearing against the outer sides of said walls.

2. An automobile visor having a top and side walls, the latter being provided with longitudinal slots, a rear view mirror arranged below said visor top, and means for adjustably supporting said mirror on said visor comprising supporting plates upon which said mirror is mounted and which are provided with hooks at their upper ends, a supporting rod which is mounted on the underside of the visor top, and on which said hooks are supported, clamping rods projecting laterally from said plates through said slots, and screw nuts arranged on said rods and engaging said walls.

WILLIAM LA HODNY.